(12) United States Patent
Wunderlich et al.

(10) Patent No.: US 10,308,202 B2
(45) Date of Patent: Jun. 4, 2019

(54) INSTRUMENT PANEL AND RESTRAINING DEVICE ASSEMBLY FOR A MOTOR VEHICLE, AND MOTOR VEHICLE WITH SUCH AN ASSEMBLY

(71) Applicant: AUDI AG, Ingolstadt (DE)

(72) Inventors: Matthias Wunderlich, Ingolstadt (DE); Stefan Schiessl, Ingolstadt (DE); Florian Seger, Vohburg (DE); Peter Sabo, Ingolstadt (DE); Richard Luijkx, Ingolstadt (DE)

(73) Assignee: Audi AG, Ingolstadt (DE)

( * ) Notice: Subject to any disclaimer, the term of this patent is extended or adjusted under 35 U.S.C. 154(b) by 45 days.

(21) Appl. No.: 15/667,085

(22) Filed: Aug. 2, 2017

(65) Prior Publication Data

US 2018/0037182 A1 Feb. 8, 2018

(30) Foreign Application Priority Data

Aug. 3, 2016 (DE) .......................... 10 2016 009 455

(51) Int. Cl.
*B60R 21/045* (2006.01)
*B60R 21/205* (2011.01)

(52) U.S. Cl.
CPC .......... *B60R 21/045* (2013.01); *B60R 21/205* (2013.01)

(58) Field of Classification Search
CPC ...... B60R 2021/0006; B60R 2021/024; B60R 2021/2173; B60R 2021/2175; B60R 21/045; B60R 21/205; B62D 25/14; B62D 25/145
See application file for complete search history.

(56) References Cited

U.S. PATENT DOCUMENTS

| | | | | |
|---|---|---|---|---|
| 6,877,766 B2 * | 4/2005 | Mikolajewski | ....... | B60R 21/045 280/728.2 |
| 6,883,833 B2 * | 4/2005 | Yamazaki | ............. | B60R 21/045 188/377 |
| 6,983,954 B2 * | 1/2006 | Sakaguchi | ............ | B60R 21/205 280/728.2 |
| 7,377,540 B2 * | 5/2008 | Tsujimoto | ........... | B60R 21/2171 280/728.2 |
| 7,448,642 B2 * | 11/2008 | Boggess | ............... | B60R 21/205 280/728.2 |
| 7,909,388 B2 * | 3/2011 | Gavrilov | ................ | B60J 5/0458 296/187.12 |

(Continued)

FOREIGN PATENT DOCUMENTS

DE  10 2006 040 032 A1  3/2008
DE  10 2009 006 960 A1  8/2010
(Continued)

*Primary Examiner* — Laura Freedman
(74) *Attorney, Agent, or Firm* — Henry M. Feiereisen LLC

(57) ABSTRACT

An assembly for a motor vehicle includes an instrument panel and a restraining device which is configured to limit a relative movement between at least a panel section of the instrument panel and a vehicle component of the motor vehicle to a predefined maximum value in a movement direction towards an interior space of a passenger cell of the motor vehicle, when a force is transmitted between the instrument panel and the vehicle component as a result of an accident that causes deformation of the instrument panel.

13 Claims, 3 Drawing Sheets

(56) References Cited

U.S. PATENT DOCUMENTS

| | | | |
|---|---|---|---|
| 8,182,026 B2* | 5/2012 | Jungert | B62D 25/145 296/193.02 |
| 8,491,037 B2* | 7/2013 | Sheng | B60R 21/045 296/187.05 |
| 8,690,184 B2* | 4/2014 | Yoshimura | B60R 21/217 280/728.2 |
| 9,845,114 B2* | 12/2017 | Hwang | B62D 25/081 |
| 9,975,528 B2* | 5/2018 | Mashiki | B60T 7/065 |
| 10,023,224 B2* | 7/2018 | An | B62D 1/197 |
| 2006/0113777 A1 | 6/2006 | Dancasius et al. | |
| 2009/0026799 A1 | 1/2009 | Gavrilov | |
| 2011/0187147 A1 | 8/2011 | Kober et al. | |

FOREIGN PATENT DOCUMENTS

| | | | |
|---|---|---|---|
| DE | 10 2010 016 748 A1 | | 11/2011 |
| DE | 10 2006 004 141 B4 | | 6/2012 |
| JP | 2013067291 A | * | 4/2013 |
| JP | 2013071676 A | * | 4/2013 |

* cited by examiner

INSTRUMENT PANEL AND RESTRAINING DEVICE ASSEMBLY FOR A MOTOR VEHICLE, AND MOTOR VEHICLE WITH SUCH AN ASSEMBLY

CROSS-REFERENCES TO RELATED APPLICATIONS

This application claims the priority of German Patent Application, Serial No. 10 2016 009 455.9, filed Aug. 3, 2016, pursuant to 35 U.S.C. 119(a)-(d), the disclosure of which is incorporated herein by reference in its entirety as if fully set forth herein.

BACKGROUND OF THE INVENTION

The present invention relates to an assembly for a motor vehicle and to a motor vehicle with such an assembly.

The following discussion of related art is provided to assist the reader in understanding the advantages of the invention, and is not to be construed as an admission that this related art is prior art to this invention.

In the art of motor vehicle construction, attempts have been made to absorb the energy or a force that is caused by an accident and to convert the energy or force into deformation work. Examples of such attempts are disclosed in DE 10 2009 006 960 A1, U.S. Pat. Nos. 8,128,148 or 7,891,726.

It would be desirable and advantageous to address prior art shortcomings and to realize maximum protection for vehicle occupants.

SUMMARY OF THE INVENTION

According to one aspect of the present invention, an assembly for a motor vehicle, includes an instrument panel, and a restraining device configured to limit a relative movement between at least a panel section of the instrument panel and a vehicle component of the motor vehicle to a predefined maximum value in a movement direction towards an interior space of a passenger cell of the motor vehicle, when a force is transmitted between the instrument panel and the vehicle component as a result of an accident that causes deformation of the instrument panel.

A component of the assembly is the instrument panel which may extend in vehicle transverse direction of the motor vehicle, as is typical for passenger cars in particular. Another component of the assembly is the restraining device by which the movement direction between a panel section of the instrument panel and the vehicle component is limited to a predefined maximum value. This is advantageous because by limiting the relative movement to the maximum value, an unwanted and inadmissible excess deformation of the instrument panel or the panel section thereof in the direction of a vehicle occupant is prevented in the event of an accident. Limiting the relative movement to the predefined maximum value thus provides maximum safety for a vehicle occupant. A crash-induced relative movement may, for example, involve a denting or bulging of the instrument panel, causing the panel section to be deflected from its original position and to be bent. Absent a restraining device according to the present invention, the relative movement could cause the instrument panel or panel section to buckle or to form sharp edges that a passenger of the vehicle may hit in the event of an accident. The provision of a restraining device according to the present invention limits this relative movement to the predefined maximum value so that the formation of such sharp edges can be effectively prevented.

The panel section may be any area of the instrument panel and may be different from respective ends of the instrument panel that bound the instrument panel in its main extension direction. Thus, the panel section may, for example, constitute a midsection of the instrument panel between the ends. The vehicle component may involve any component portion at a distance (unequal to zero) to the instrument panel. This has the advantage that the instrument panel and the vehicle component do not directly support one another, so that corresponding inherent elasticities of the vehicle component and the instrument panel can be better exploited to dissipate at least part of the energy that is generated by a crash. The force transmission may also be locally limited to the predefined panel section so as to tailor the limitation of the relative movement of the panel section to the predefined maximum value. An accident may involve, for example, a side impact (side crash) of the motor vehicle to cause upsetting of the instrument panel in a main extension direction for example, resulting in a relative movement of the panel section.

The provision of a restraining device according to the present invention thus effects a local limitation of the relative movement of the panel section and maximum protection of a vehicle occupant in proximity of the panel section, i.e. a vehicle occupant seated in front of the panel section of the instrument panel in a transverse extension direction of the instrument panel for example.

According to another advantageous feature of the present invention, a dashboard support can be provided to mount the instrument panel to the motor vehicle, with the restraining device being coupled to the dashboard support for force transmission. This is advantageous because a dashboard support is very stable and thus especially suitable for force transmission.

According to another advantageous feature of the present invention, an airbag device can be secured to the instrument panel and include a chute channel element, with the restraining device being coupled to the chute channel element for force transmission. This is advantageous because the force transmission thus takes place in the region of the airbag device. As a result, a predefined direction of action of the airbag device can be maintained substantially also in the event of an accident. The direction of action corresponds hereby to the direction in which the airbag is deployed as desired, in the event of an accident, so as to protect a vehicle occupant from injury. The direction of action may hereby be oriented, for example, in the transverse extension direction for the airbag device that is secured to the instrument panel.

According to another advantageous feature of the present invention, the restraining device can include a malleable deformation component which undergoes deformation, when the instrument panel deforms as a result of the accident and the relative movement is limited. This is advantageous because the predetermined deformation of the deformation component or a plurality of deformation components is able to establish a targeted dissipation of at least part of the energy (crash energy) caused by the accident. The deformation component may be formed of plastically deformable sheet metal or plastic. The deformation component may include an arched and/or undulated region for example, and thus can deform in a predetermined manner so that this region deforms by the maximum value for example during a crash, i.e. stretched by the maximum value for example. In this way, the relative movement of the panel section can be limited in a particular simple manner to the maximum value.

According to another advantageous feature of the present invention, the deformation component can include a fabric to limit the relative movement. This is advantageous because the provision of such a fabric permits a relative movement between the vehicle component and the instrument panel prior to reaching the maximum value substantially without force transmission or only at slight force transmission, so that crash energy can be effectively dissipated by the permitted, free deformation of the panel section until reaching the maximum value. Once the maximum value has been reached, the fabric may assume a tensed state and thus effectively inhibits any further relative movement of the panel section in the direction of the interior space of the passenger cell. The fabric may be made from natural fibers or plastic fibers for example.

According to another advantageous feature of the present invention, the deformation component can include a spring element to limit the relative movement. This is advantageous because part of the energy released during the crash can be converted into tensioning work to tense the spring element. The spring element may be configured as coil spring and thus has a defined spring characteristic.

According to another advantageous feature of the present invention, the deformation component can include a damper element to limit the relative movement. This is advantageous because part of the energy released during the crash can be converted into damping work by the damper element. The damper element may involve a shock absorber with defined damping characteristic.

According to another advantageous feature of the present invention, the deformation component can include an undulated region when in a state absent any deformation thereof. This is advantageous because the predefined maximum value can then be easily adjusted as the undulated region deforms from the non-deformed state to a particular deformation state. The undulated region can thus be deformed for example by an amount of the predefined maximum value from the non-deformed state to the particular deformation state.

According to another aspect of the present invention, a motor vehicle includes a passenger cell, a vehicle component, and an assembly including an instrument panel, and a restraining device configured to limit a relative movement between a panel section of the instrument panel and the vehicle component to a predefined maximum value in a movement direction towards an interior space of the passenger cell, when a force is transmitted between the instrument panel and the vehicle component as a result of an accident that causes deformation of the instrument panel.

A motor vehicle in accordance with the present invention provides high safety for vehicle occupants.

According to another advantageous feature of the present invention, the vehicle component can be embodied as a cross member or a side rail of the motor vehicle. A cross member or side rail are especially suitable for force transmission in order to limit the relative movement as a result of a crash to the predefined maximum value. The reason being the particular stable configuration of the cross member or side rail.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4b is a side view of the deformation component of FIG. 4a;

DETAILED DESCRIPTION OF PREFERRED EMBODIMENTS

Figure 1:
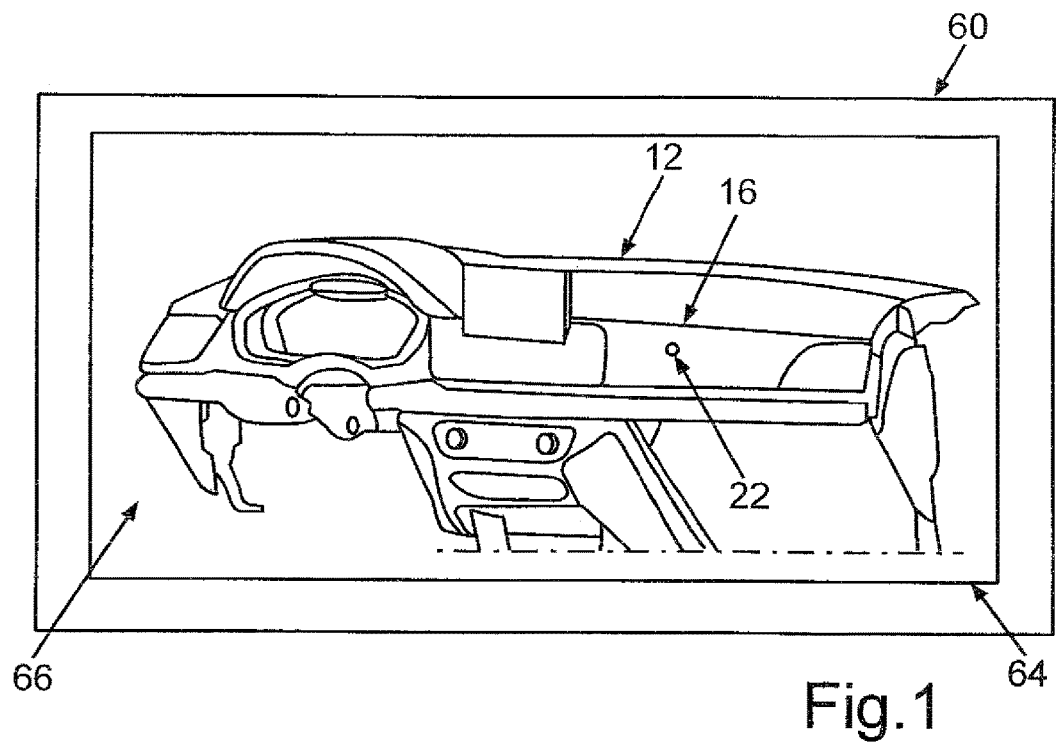
FIG. 1 is a perspective view of a portion of a motor vehicle, depicting an instrument panel constituting a part of an assembly according to the present invention and bounding an interior space of a passenger cell of the motor vehicle.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 2:
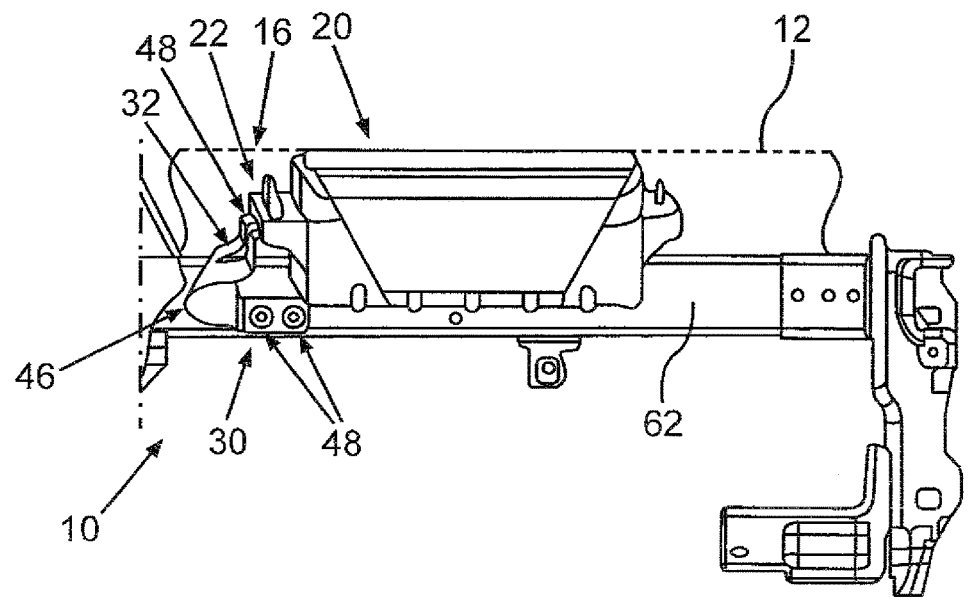
FIG. 2 is a perspective view of the instrument panel with attached airbag device having a chute channel for force-transmitting coupling of a restraining device as another part of the assembly according to the present invention.
Figure 5:
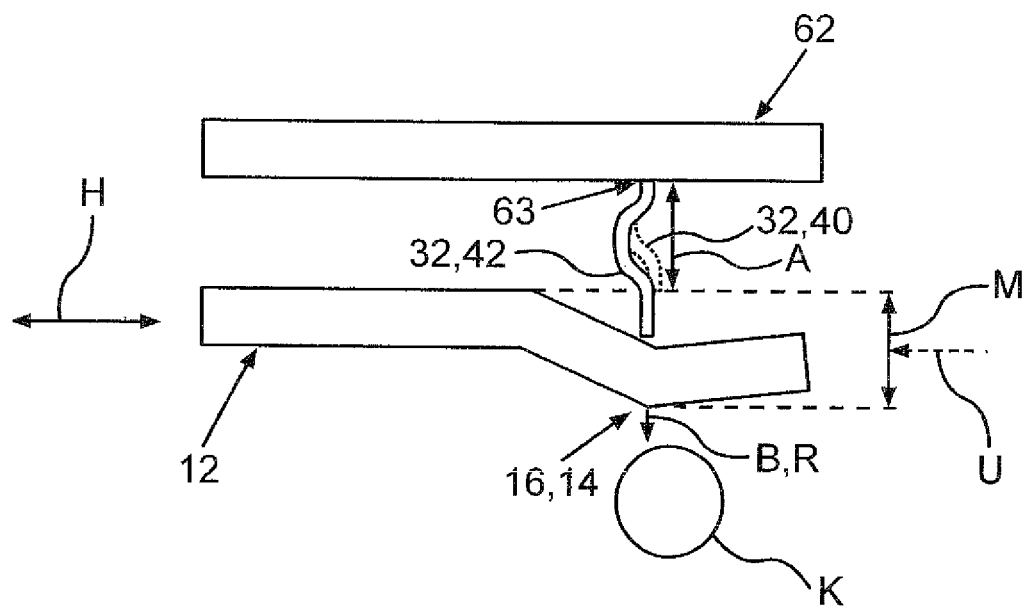
FIG. 5 is a schematic sectional view of the instrument panel in force-transmitting connection with a vehicle component via the deformation component.

Turning now to the drawing, and in particular to FIG. 1, there is shown a perspective view of a portion of a motor vehicle, shown only schematically and generally designated by reference numeral 60, depicting an instrument panel 12 which constitutes part of an assembly 10 according to the present invention, shown in greater detail in FIG. 2. The instrument panel 12 bounds a region of an interior space 66 of a passenger cell 64 of the motor vehicle 60. Although being invisible and therefore only hinted schematically in FIG. 1 by way of a dot is chute channel element 22, which is part of an airbag device 20, shown in FIG. 2, and to which a deformation component 32 of a restraining device 30, also shown in FIG. 2, is coupled in a force-transmitting manner. FIG. 2 shows hereby a panel section of the assembly 10 which includes the instrument panel 12 and the restraining device 30. The restraining device 30 is provided for force transmission between the instrument panel 12 and a vehicle component 62, e.g. a cross member of the motor vehicle 60, in the event of an accident in an impact direction, indicated by arrow U, that causes a deformation 14 of the instrument panel 12, as shown in FIG. 5. FIG. 5 further indicates a main extension direction H of the instrument panel 12. In the non-limiting example shown in FIG. 5, the main extension direction H of the instrument panel 12 corresponds to a vehicle transverse direction of the motor vehicle 60, as this is typical for a passenger car.

Figure 3:
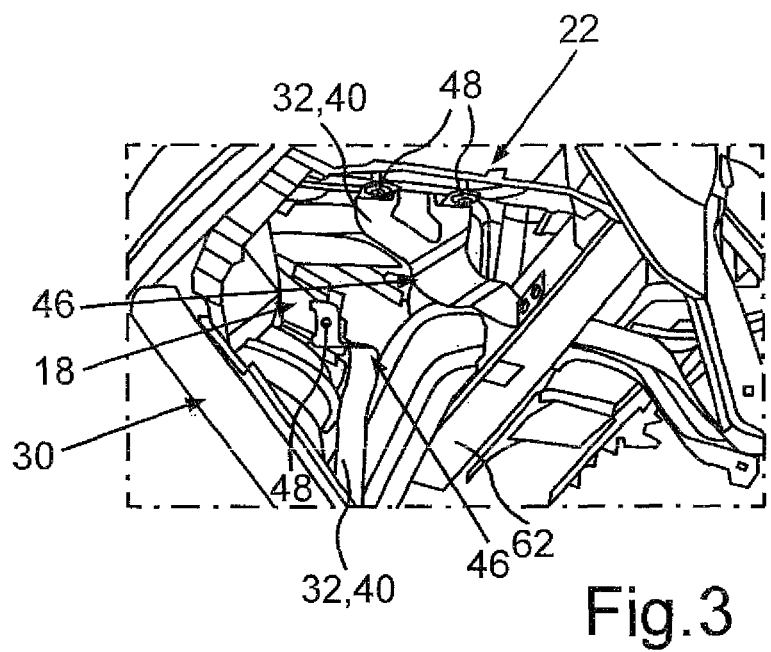
FIG. 3 is a perspective view of another region of a motor vehicle, depicting the instrument panel in force-transmitting connection with vehicle components via deformation components.

As shown in FIG. 3, which is a perspective view of another region of the motor vehicle 60, the restraining device 30 includes a plurality of deformation components 32 and respective fastening elements, e.g. screw fasteners) for securing the deformation components 32. In the presence of a force transmission caused by a crash, the restraining device 30 is configured to limit a relative movement R, indicated in FIG. 5, to a predefined maximum value M in a movement direction towards the interior space 66 of the passenger cell 64 of the motor vehicle 60 between at least a panel section 16 of the instrument panel 12 and the at least one vehicle component 62. The predefined maximum value M is also indicated in FIG. 5 and is established when the instrument panel 12 or the panel section 16 of the instrument panel 12 undergoes deformation in the movement direction during the relative movement R. The movement direction is indicated hereinafter by an arrow that depicts the relative movement R.

The airbag device 20, shown in FIG. 2, is mounted to the instrument panel 12, and the restraining device 30 is coupled, as described above, for force transmission with the chute channel element 22, with the force transmission being established here between the vehicle component 62 and the chute channel element 22 (and thus with the instrument panel 12) via the deformation component 32. As is readily apparent in combination with FIG. 3, the restraining device 30 can be coupled for force transmission not only to the chute channel element 22 but also to a dashboard support 18 by which the instrument panel 12 can be secured to the motor vehicle 60. In the non-limiting example shown here, the restraining device 30 thus includes two deformation components 32, coupled to the instrument panel 12, with one of the deformation components 32 also being coupled to the dashboard support 18, and the other deformation component 32 also being coupled to the chute channel element 22. The deformation components 32 shown in FIGS. 2 and 3 are designed as single-piece sheet metal parts and thus are cost-effectively to produce. As an alternative, at least one of the deformation components 32 may also be made of plastic.

FIGS. 2, 3, 4a and 4b show also that the deformation components 32 have respective ends forming mounting points 48 which, by way of example, are embodied here as through openings, and to which the deformation components 32 can be mounted via fastening elements. For example, the deformation components 32 can be secured via the mounting points 48 to the vehicle component 62.

Figure 4A:
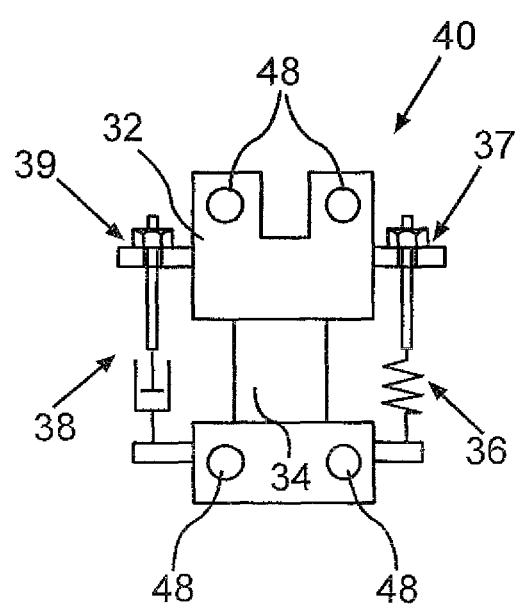
FIG. 4a is a schematic plan view of an exemplified embodiment of a deformation component.
Figure 4B:
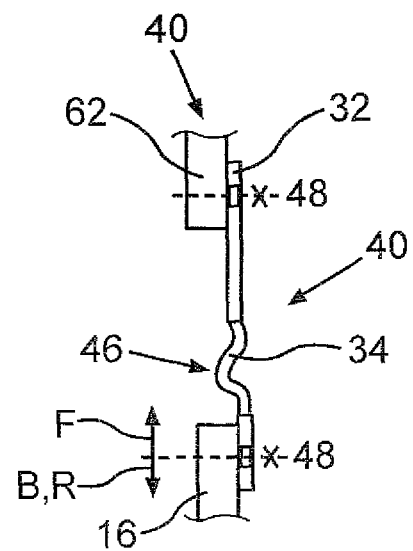

FIGS. 4a and 4b show an exemplified embodiment of the deformation component 32. The deformation component 32 is made of several parts. Opposite component ends of the deformation component 32, which also include the mounting points 48, are formed from sheet metal, whereas a fabric 34 is arranged between the component ends. The fabric 34 is shown in FIGS. 4a and 4b in a non-deformed state, indicated by reference numeral 40, in which non-deformed state 40 the fabric 34 has an undulated region 46. Also those deformation components 32, made in one piece of sheet metal and shown in FIG. 3, have such an undulated region 46, when being in a non-deformed state 40. The non-deformed state 40 is assumed in the absence of an accident of the motor vehicle 60.

The fabric 34, like the spring element 36 shown in FIG. 4a, and a damper element 38 are provided to limit the relative movement R of at least the panel section 16 of the instrument panel 12. The spring element 36 and the damper element 38 are provided here by way of example only as additional elements to the fabric 34 in order to dissipate an additional part of the energy generated in a crash. Furthermore, the spring element 36 and the damper element 38 are shown here by way of example and for ease of illustration to be secured on opposite sides of the deformation component 32. The spring element 36 and the damper element 38 are each slidingly mounted at least substantially without any force at the upper end of the deformation component 32, as shown in FIGS. 4a and 4b.

As shown in FIG. 4a, the spring element 36 is coupled in a freewheeling direction F to the upper component end of the deformation component 32 via a spring bearing 37, and the damper element 38 is coupled in the freewheeling direction F to the upper component end of the deformation component 32 via a damper bearing 39. Both the spring bearing 37 and the damper bearing 39 permit a substantially relative displacement without any force of the spring element 36 and the damper element 38, respectively, in the freewheeling direction F, whereas a spring force of the spring element 36 or a damper force of the damper element 38 can be transmitted to the upper component end. In other words, in the non-deformed state 40, shown in FIGS. 4a and 4b, the spring force or the damper force can be transmitted via the deformation component 32 between the vehicle component 62 and the panel section 16 in the limitation direction B, whereas a transmission of the spring force or damper force in the freewheeling direction F does not take place. Thus, no or only a slight force is exerted via the spring element 36 and the damper element 38 upon the panel section 16 of the instrument panel 12, when the panel section 16, connected in FIG. 4b to the lower end of the deformation component 32, moves in the freewheeling direction F towards the vehicle component 62. This is of particular advantage, when a head K of the vehicle occupant, as shown in FIG. 6, hits the panel section 16, especially since the spring element 36 and the damper element 38 can be displaced in the freewheeling direction F substantially without encountering resistance or only little resistance.

The movement of at least the panel section 16 is limited in a limitation direction B, oriented here along the movement direction of the relative movement R, by a deformation of the deformation component 32 from its non-deformed state 40 to a first deformation state 42, as a component distance A, shown in FIG. 5, between the vehicle component 62 and the panel section 16 increases. The first deformation state 42 is established for example, when the fabric 34 is at maximum tension to thereby increase a component distance A by the maximum value M. The deformation component 32 is attached in FIGS. 5 and 6 at a component region 63 to the vehicle component 62. Measured from the component region 63, the instrument panel 12 is spaced from the vehicle component 62 by the component distance A in the absence of a crash. The deformation component 32 can no longer be deformed in the first deformation state 42 in the direction of the movement direction of the relative movement R (and thus in the limitation direction B). For that reason, the panel section 16 can be held by the deformation component 32 upon the vehicle component 62, when the relative movement R is limited to the predefined maximum value M. In other words, the deformation component 32 prevents a movement of the panel section 16 in the direction of the head K beyond the predefined maximum value M.

Figure 6:
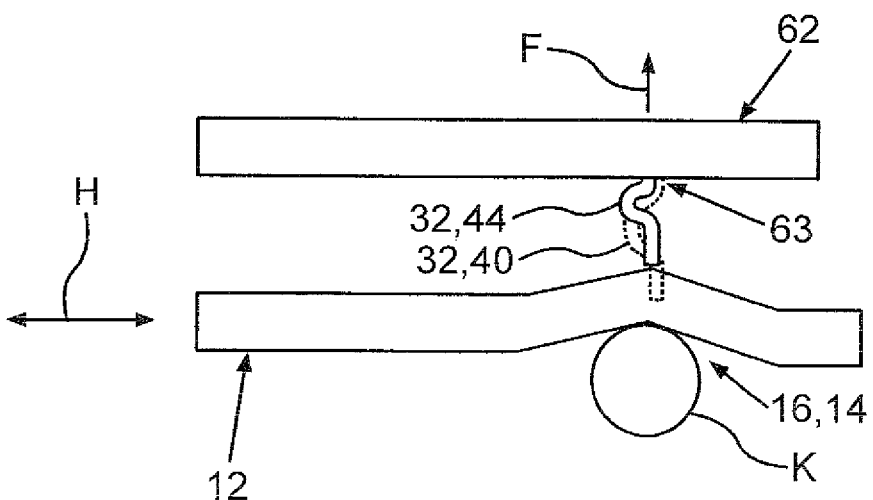
FIG. 6 is a schematic sectional view of the instrument panel, depicting a vehicle occupant with his head impacting a panel section of the instrument panel and a resultant deformation of the panel section along a transverse extension direction of the instrument panel.

While FIG. 5 shows the limitation of the relative movement R to the maximum value M in the movement direction of the relative movement R, FIG. 6 readily illustrates a deformability of the deformation component 32 of the restraining device 30 in a second deformation state 44 in the event of an impact of the head K of a vehicle occupant upon the panel section 16. Such an impact may occur, for example, in a head-on collision of the motor vehicle 60 in an impact direction perpendicular to the accident indicated by arrow U. In such an impact, the deformation component 32 can be compressed in the freewheeling direction F, so that the deformation component 32 exerts a particularly slight resistance force as a result of the freewheeling or sliding spring element 36 and the freewheeling or sliding damper element 38. The fabric 34 of the multipart deformation component 32 shown in FIGS. 4*a* and 4*b*, and the single-piece deformation component 32 may advantageously be configured to cushion the impact of the head K during compression. The deformation components 32 can therefore jointly cushion in the freewheeling direction—and thus as they move to the second deformation state 44—the impact of the head K and thus absorb it. The fabric 34 is also in a relaxed state in the second deformation state 44, with the fabric 34 again forming the undulated region 46.

To clearly show the deformability thereof, the non-deformed state of the deformation component 32 is depicted in FIGS. 5 and 6 by broken lines, respectively.

In accordance with the present invention, the restraining device 30 can include a plurality of deformation components 32, shown here as downholders, in order to limit a relative movement R of the instrument panel 12 in the event of a crash, such as side impact. As a result, a deflection of the instrument panel 12 and its relative movement R can be limited to the maximum value M, so that a formation of sharp edges at least in the area of the panel section 16 can be effectively prevented. In addition, head acceleration values of the head K of the vehicle occupants can be reduced, when the head K impacts the instrument panel 12, as the deformation component 32 undergoes deformation to assume the second deformation state 44 which corresponds to a defined deformation state of the deformation component 32.

At least one of the deformation components 32 (downholder) can be bolted to or as an alternative hook behind the vehicle component 60 which may be configured, for example, as modular cross member, and also mounted to the chute channel element 22 of the airbag device 20, which may be embodied, for example, as a passenger-side airbag. Optionally, it may also be possible to secure the deformation component 32, instead of the chute channel element 22 of the passenger airbag, directly to the dashboard support 18. FIG. 3 shows hereby both types of securements, with one of the deformation components 32 of the restraining device 30 being connected with the dashboard support 18, and another one of the deformation components 32 of the restraining device 30 being connected to the chute channel element 22, at the respective mounting points 48.

The deformation components 32 may be formed as a single piece from sheet metal or may be formed of several parts. Provision of the fabric 34 may be contemplated in particular when a multipart construction is involved, with the fabric 34 extending between the opposing component ends of the deformation component 32 and secured thereto.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An assembly for a motor vehicle, said assembly comprising:
   an instrument panel; and
   a restraining device configured to limit a relative movement between at least a panel section of the instrument panel and a vehicle component of the motor vehicle to a predefined maximum value in a movement direction towards an interior space of a passenger cell of the motor vehicle, when a force is transmitted between the instrument panel and the vehicle component as a result of an accident that causes deformation of the instrument panel,
   wherein the restraining device includes a malleable deformation component which undergoes deformation when the instrument panel deforms as a result of the accident and the relative movement is limited,
   wherein the deformation component includes a fabric extending between opposing ends of the deformation component to limit the relative movement.

2. The assembly of claim 1, further comprising a dashboard support configured to mount the instrument panel to the motor vehicle, said restraining device being coupled to the dashboard support for force transmission.

3. The assembly of claim 1, further comprising an airbag device secured to the instrument panel and including a chute channel element, said restraining device being coupled to the chute channel element for force transmission.

4. The assembly of claim 1, wherein the deformation component includes a spring element to limit the relative movement.

5. The assembly of claim 1, wherein the deformation component includes a damper element to limit the relative movement.

6. The assembly of claim 1, wherein the deformation component includes an undulated region when in a state absent any deformation thereof.

7. A motor vehicle, comprising:
   a passenger cell;
   a vehicle component; and
   an assembly comprising an instrument panel, and a restraining device configured to limit a relative movement between at least a panel section of the instrument panel and the vehicle component of the motor vehicle to a predefined maximum value in a movement direction towards an interior space of the passenger cell of the motor vehicle, when a force is transmitted between the instrument panel and the vehicle component as a result of an accident that causes deformation of the instrument panel,
   wherein the restraining device includes a malleable deformation component which undergoes deformation when the instrument panel deforms as a result of the accident and the relative movement is limited,
   wherein the deformation component includes a fabric extending between opposing ends of the deformation component to limit the relative movement.

8. The motor vehicle of claim 7, wherein the assembly includes a dashboard support configured to mount the instrument panel to the motor vehicle, said restraining device being coupled to the dashboard support for force transmission.

9. The motor vehicle of claim 7, wherein the assembly includes an airbag device secured to the instrument panel and including a chute channel element, said restraining device being coupled to the chute channel element for force transmission.

10. The motor vehicle of claim 7, wherein the deformation component includes a spring element to limit the relative movement.

11. The motor vehicle of claim 7, wherein the deformation component includes a damper element to limit the relative movement.

12. The motor vehicle of claim 7, wherein the deformation component includes an undulated region when in a state absent any deformation thereof.

13. The motor vehicle of claim 7, wherein the vehicle component is embodied as a cross member or a side rail of the motor vehicle.

* * * * *